United States Patent
Mitchell et al.

(10) Patent No.: US 7,627,254 B2
(45) Date of Patent: Dec. 1, 2009

(54) AUTOMATED OPTICAL LINK POWER CONTROL

(75) Inventors: Matthew L. Mitchell, Sunnyvale, CA (US); Robert B. Taylor, Charleston, SC (US); Edward E. Sprague, Woodside, CA (US)

(73) Assignee: Infinera Corporation, Sunnyvale, CA (US)

( * ) Notice: Subject to any disclaimer, the term of this patent is extended or adjusted under 35 U.S.C. 154(b) by 111 days.

(21) Appl. No.: 11/425,944

(22) Filed: Jun. 22, 2006

(65) Prior Publication Data

US 2007/0002430 A1    Jan. 4, 2007

Related U.S. Application Data

(60) Provisional application No. 60/695,521, filed on Jun. 30, 2005.

(51) Int. Cl.
*H04B 10/00* (2006.01)
(52) U.S. Cl. .............................. 398/168
(58) Field of Classification Search ............... 398/168
See application file for complete search history.

(56) References Cited

U.S. PATENT DOCUMENTS

| | | | |
|---|---|---|---|
| 6,452,722 B1 | 9/2002 | Krummrich et al. | |
| 6,614,587 B1 | 9/2003 | Yu et al. | 359/337.12 |
| 6,690,505 B1 | 2/2004 | Ye | 359/337 |
| 6,718,080 B2 | 4/2004 | Ofek et al. | 385/15 |
| 6,762,878 B2 | 7/2004 | Park et al. | 359/341.42 |
| 6,798,567 B2 | 9/2004 | Feldman et al. | |
| 2002/0093729 A1 | 7/2002 | Gerish et al. | |

FOREIGN PATENT DOCUMENTS

DE    19838788 A1    3/2000

OTHER PUBLICATIONS

Srivastava et al. Fast-Link Control Protection of Surviving Channels in Multiwavelength Optical Networks. IEEE Photonics Technology Letters, vol. 9. No. 12. Dec. 1997.

*Primary Examiner*—Eric Bolda
*Assistant Examiner*—Ari M Diacou
(74) *Attorney, Agent, or Firm*—W. Douglas Carothers, Jr.; David L. Soltz

(57) ABSTRACT

A system, apparatus and method are described for controlling the gain across one or more amplifier nodes within an optical span. In one embodiment, a fast local amplifier constant gain control loop is provided that maintains a constant gain across an amplifier node for each of the channels within an optical signal. A slow link level gain setting control loop is provided to set and/or adjust the target gain on the amplifier node(s). A gain adjust sequence is performed by the slow link level gain setting control loop to adjust the target gain(s) in response to various events and mechanisms. A "time of flight" protection method is also provided to ensure consistency between the fast local amplifier gain control loop and the slow link level gain setting control loop.

11 Claims, 4 Drawing Sheets

AUTOMATED OPTICAL LINK POWER CONTROL

CROSS REFERENCE TO RELATED PATENT APPLICATIONS

This application claims priority to U.S. Provisional Application Ser. No. 60/695,521, entitled "Automated Optical Link Power Control System," filed Jun. 30, 2005, which application is incorporated herein by reference in its entirety.

BACKGROUND

A. Technical Field

This application relates to optical signal power control, and more particularly, to the control of variable gain amplifiers to provide constant gain on each channel within an optical signal.

B. Background of the Invention

The importance of optical networking technology in today's society is well understood. Optical networks allow large amounts of information to be transmitted at high data rates across very long distances. In optical long haul scenarios, multiple channels or wavelengths are typically multiplexed together and inserted into a fiber optic cable that spans a long distance. The optical signal, comprising multiple wavelengths, propagates within the fiber optic cable until its destination is reached. This signal may then be demultiplexed and the individual wavelengths further processed.

It is oftentimes important that the optical power levels of the wavelengths or channels have a particular power profile. For example, it is commonly preferred that each wavelength within a wave length division multiplexed signal have the same power level. These power levels may be controlled according to span looses and gain values of optical amplifiers along an optical link. Optical spans typically have optical amplifiers that are inserted within the optical fiber. An optical amplifier applies a gain to each wavelength within an optical signal resulting in an output power level for each wavelength.

The per channel power and total power of all signal channels should be controlled at both an input and output of a network node and across optical fiber spans. These nodes include, but are not limited to, EDFAs, optical add/drop nodes, data transmit and receive nodes and dispersion compensation nodes.

Controlling optical channel power is further complicated when the number of optical channels within an optical link varies overtime. In particular, if the number of channels within an optical signal changes, then the gain on one or more optical amplifiers within the link may need to be varied in order to maintain a preferred output optical power on each of the channels. Referring to FIG. 1, an optical link 100 is shown including a head end node 110 and a far end node 150. The head end node 110 is coupled to the far end node 150 by fiber optic cable and multiple optical amplifiers. In this instance, there is a first optical amplifier 120, a second optical amplifier 130 continuing to an Nth optical amplifier 140.

In order to properly manage this link, the power levels on both the input and output of each of the optical amplifiers (120, 130, 140, 150) should be controlled. As mentioned above, these power levels may incur penalties when the number of optical channels suddenly changes and the amplifiers are unable to quickly respond. Many systems also use only fixed gain amplifies which require that all the span losses have to be of a predetermined loss value. The use of fixed gain amplifiers makes power management on the link 100 even more difficult. For example, certain systems may use attenuating pads within an optical link to match the span loss to the fixed gain of the amplifiers.

Accordingly, what is needed is a system and method that address the above-described shortcomings.

SUMMARY OF THE INVENTION

A system, apparatus and method are described for controlling the gain across one or more amplifier nodes within an optical link. In one embodiment, a fast local amplifier constant gain control loop is provided that maintains a constant gain across an amplifier node for each of the channels within an optical signal. A slow link level gain setting control loop is provided to set and/or adjust the target gain on the amplifier node(s). A gain adjust sequence is performed by the slow link level gain setting control loop to adjust the target gain(s) in response to various events and mechanisms. A "time of flight" protection method is also provided to ensure consistency between the fast local amplifier gain control loop and the slow link level gain setting control loop.

A fast local amplifier gain control loop and a slow link level gain setting control loop maintain constant gain across all of the optical channels at an amplifier node even though the number of channels within the signal may vary. The fast local amplifier gain control loop responds to sudden changes in power levels at an amplifier output (or input) by adjusting the gain on the amplifier in order to maintain constant gain on each channel. As a result, each channel within the signal sees a fixed gain and loss profile on the optical link, which is independent of the total number of channels within the signal.

The slow link level gain setting control loops set target gain values for each of the amplifier nodes within the optical link. These slower control loops respond to relatively slower changes in power levels caused by events such as changes in temperatures of components within the optical link or changes in performance of the components as they age.

A gain adjust sequence is provided so that a slow link level gain setting control loop may adjust the target gain values on each of the amplifier nodes. Various events and mechanisms may be used to trigger the gain adjust sequence. For example, a gain adjust sequence may be initiated by an amplifier node within the span by transmitting an amplifier gain request. This amplifier gain request may be generated in response to information detected locally at the amplifier such as a change in an input power below or above a predefined threshold. In other examples, a gain adjust sequence may be initiated at the initial installation of the optical span, at defined period time increments, or in response to changes in the number of channels within a system. One skilled in the art will recognize that other events and mechanisms may be used to trigger a gain adjust sequence.

Because the fast local amplifier gain control loop and the slow link level gain setting control loop operate at relatively different speeds, a "time of flight" protection method is provided to ensure that both local measurements and calculations at the amplifier are synchronized with the slower gain parameters transmitted from the head end node. This protection method ensures that target gain levels on the amplifiers are set using the most current information from the optical link.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method are described for controlling the gain across one or more amplifier nodes within an optical link. In one embodiment, a fast local amplifier constant gain control loop is provided that maintains a constant gain across an amplifier node for each of the channels within an optical signal. A slow link level gain setting control loop is provided to set and/or adjust the target gain on the amplifier node(s). A gain adjust sequence is performed by the slow link level gain setting control loop to adjust the target gain(s) in response to various events and mechanisms. A "time of flight" protection method is also provided to ensure consistency between the fast local amplifier gain control loop and the slow link level gain setting control loop.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview of Control Loops

Figure 1:
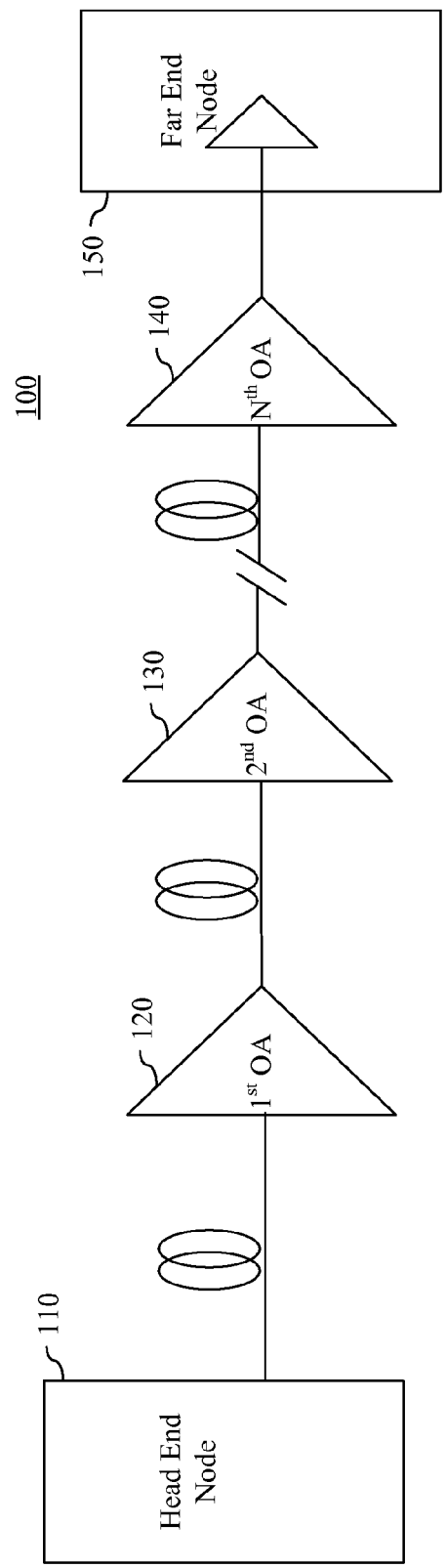
FIG. 1 is a prior art diagram of an optical span including multiple optical amplifiers.
Figure 2:
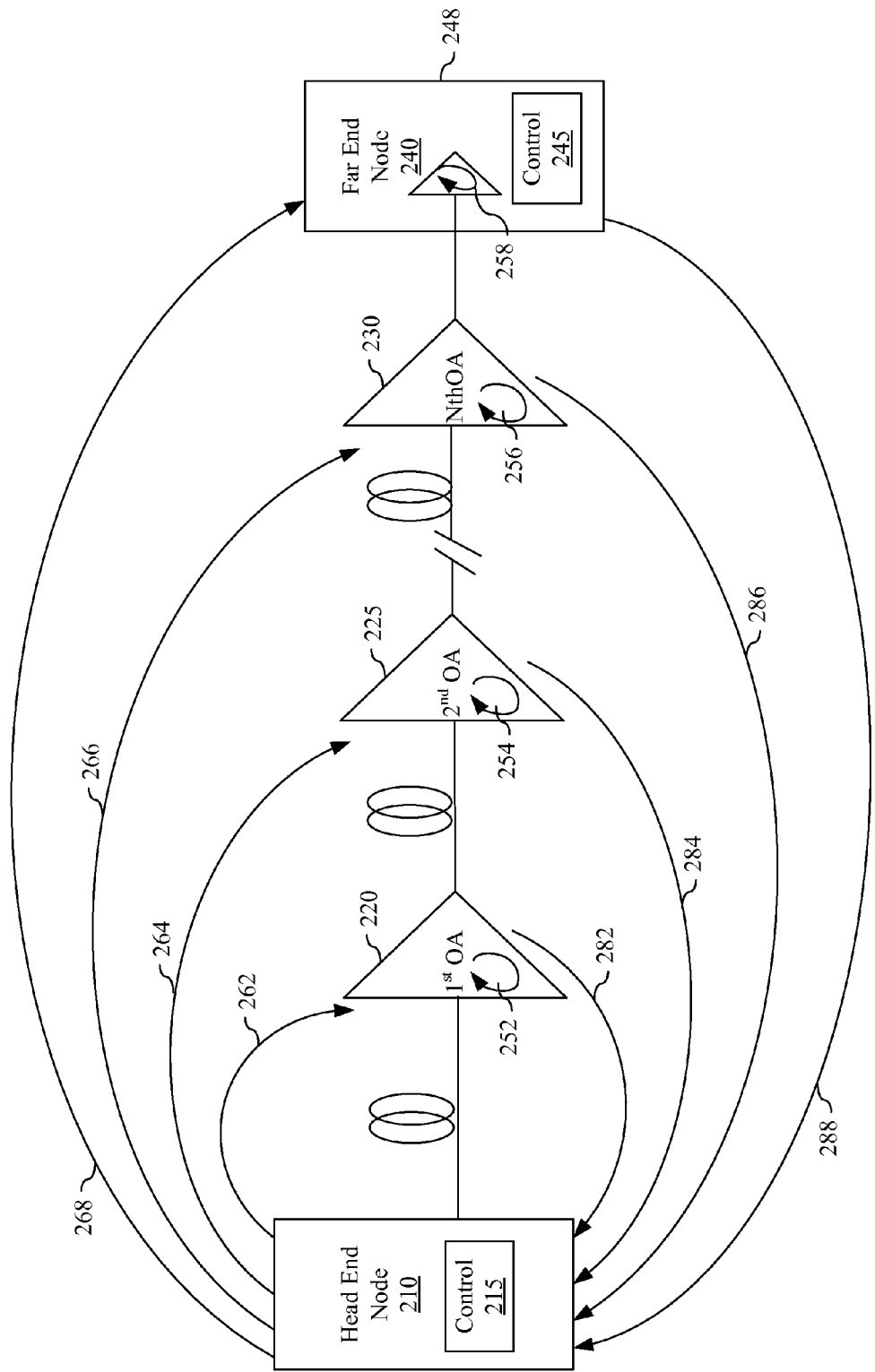
FIG. 2 is a control system, including both fast local amplifier gain control loops and slow link level gain setting control loops, for an optical span according to one embodiment of the invention.

FIG. 2 illustrates a control system for an optical link according to one embodiment. The system includes a head end node 210, from which an optical signal originates, and a far end node 240, that terminates the optical signal. The head end node 210 comprises a control module 215 and the far end node 240 comprises another control module 245 and amplifier 240 that may perform functions such as pre-amplification. The optical link includes multiple optical amplifier nodes 220, 225, 230 that amplify each of the channels within the optical signal. The amplifier nodes may comprise erbium doped fiber amplifiers ("EDFAs"), semiconductor optical amplifiers ("SOAs"), or any other method of possible optical amplification employed in an optical transport or transmission network.

Each of the optical amplifier nodes has a fast amplifier constant gain control loop 252, 254, 256, 258 that maintains a constant gain on each of the channels in the optical signal. Slow link gain setting control loops 262, 264, 266, 268 are used by the head end node 210 to set target gain values for each of the optical amplifier nodes 220, 225, 230 and the amplifier 248 in the far end node. One skilled in the art will recognize that various parameters associated within the optical link may be used in defining these target gain values. These parameters may include the number of channels within the optical signal, the target per channel power, the type of optical fiber within the link, and the accumulated amplified spontaneous emission ("ASE") within the optical link (the added ASE is a function of each of the optical amplifiers in the optical link and the added ASE may be calculated based upon the gain set point).

The target gain values or the slow control loop may be calculated locally at the amplifier node or at the head end node. When calculated at a site other than the link amplifier node, the target is communicated to the local amplifier node in the link for setting the gain target.

In one embodiment of the invention, information on the slow link gain setting control loop 262, 264, 266, 268 is communicated on unique wavelengths/channels on the optical link, each of which is associated with a specific control loop. For example, a first slow link gain setting control loop 262 between the head end node 210 and the first optical amplifier 220 is used to set or adjust a target gain value across the first optical amplifier 220.

Based on this target gain value, a first fast amplifier constant gain control loop 252 maintains a constant gain across the first optical amplifier 220 for each of the channels within an optical signal. In one embodiment of the invention, this constant gain is achieved by monitoring the input and output power at the first optical amplifier 220 and varying the gain applied to ensure that the gain seen by each channel remains constant at the target gain value. This first fast amplifier gain control loop 252 is able to quickly compensate for sudden power changes in the optical link, such as those caused by power failures, cut fibers, added/deleted channels within the signal, etc. The first fast amplifier gain control loop 252 may also compensate for ASE that is generated locally at the first optical amplifier 220. As a result, if the number of channel signals within the optical signal quickly changes, then the power evolution profile of a single channel signal is nearly held constant.

A gain adjust sequence is used to set or adjust the target gain values for each of the amplifier nodes 220, 225, 230 and 240. The control system further comprises amplifier gain request paths 282, 284, 286, 288 on which amplifier gain requests are communicated from an amplifier to the control module 215 within the head end node 210. As will be described in more detail later, the gain adjust sequence may be initiated in various ways, including the head node 210 receiving an amplifier gain request on one of the amplifier gain request paths 282, 284, 286, 288.

An inherent timing issue may occur in which power changes and parameter information updating processes are misaligned. These timing issues are caused by the differing speeds of the fast amplifier constant gain control loops and slow link gain setting control loops. A "time of flight" protection methodology is provided that addresses these issues and is described later in more detail.

B. Gain Adjust Sequence

The process of calculating and setting the gains is called a gain adjust sequence. In one embodiment, this process is serially executed such that the link level slow gain setting control loop starts at a first amplifier in the optical link and then proceeds to a second amplifier and so on down the link including the last amplifier which is here in the far end node. This serial approach assures accuracy of the target gain calculations and values.

Figure 3:
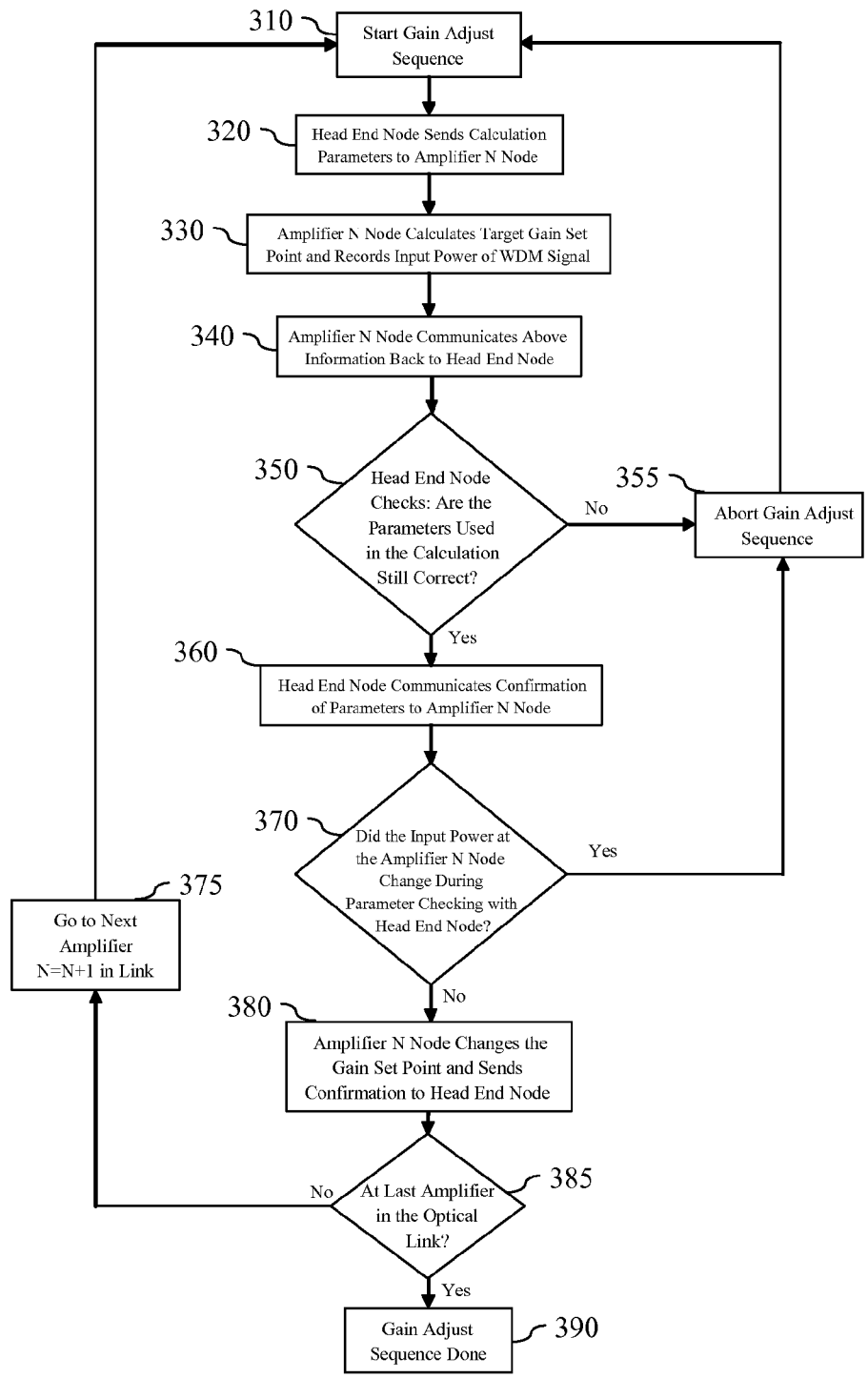
FIG. 3 is a flowchart describing a method for gain control at multiple nodes on an optical link and time of flight protection according to one embodiment of the invention.

FIG. 3 is a flowchart illustrating a method, independent of structure, for adjusting a target gain value on a plurality of optical amplification nodes according to one embodiment of the invention. A gain adjust sequence is started 310 in response to some initiating event such as an installation of an optical link, span loss changes, defined time period, a change in the number of channels within a system, an amplifier gain request event, or any other event which could require an adjustment of the optical link powers.

The head end node sends 320 calculation parameters to an amplifier node within the optical link. These parameters may include a target output power for each channel within the optical link as well as other parameters.

The amplifier node receives the calculation parameters and calculates 330 a target gain set point and records an input power level of the optical signal. The amplifier node communicates 340 this target gain set point to the head end node.

The head end node checks 350 to see if the parameters used to calculate the target gain set point are still correct and current. In one embodiment of the invention, this checking procedure may involve determining whether the parameters used to calculate the target gain set point were the last transmitted by the head end node. In another embodiment, the head end node determines whether any if any of the parameters may have changed by analyzing the parameters received from the optical amplifier node.

If there were subsequent parameters communicated by the head end node, then the gain set point is not deemed valid and the gain adjust sequence is aborted 355. If the parameters are current, then the head end node communicates 360 a confirmation of the parameters to the amplifier node.

The amplifier confirms that its gain set point is still current by checking 370 to see if the input power that it had previously recorded has not changed beyond a certain tolerance during the parameter check with the head end node. If there was a sufficiently large enough change in input power, then the gain adjust sequence is aborted 355. However, if the input power did not change, then the node updates/changes 380 its gain target value to the gain set point and sends confirmation to the head end node.

Steps 340 through 380 are defined as "time of flight" protection because the checking by both the head end node and the amplifier ensures that both local measurements and calculations at the amplifier are aligned with the slower gain parameters transmitted from the head end node. In particular, the "time of flight" steps are intended to detect a parameter change at the head end node or the amplifier that occurred during a gain change at the amplifier. For example, a change in the number of multiplexed channel signals in the outbound transported signal or a change in power at the input to amplifier will result to nullify the instant gain adjust sequence.

A check is performed to determine 385 whether the amplifier is the last one in the optical link. If it is the last amplifier, then the gain-adjust sequence is complete 390. If there are additional amplifiers in the amplifier sequence, then steps 310 through 385 are performed 375 for the next optical amplifier node.

C. Gain Adjust Request Event

As previously discussed, a number of different events or mechanisms may initiate a gain adjust sequence, including a gain adjust request from one of the optical amplifiers in an optical link. Each amplifier constantly monitors it's signal input power and detects when this input power changes higher or lower by a given amount over, for example, a minimum threshold. If the threshold is exceeded, then the optical amplifier node may request a new gain adjust sequence. The new gain adjust sequence will correct the powers and gains in the network for any deviations that have occurred, such as a change in optical span loss.

Figure 4:
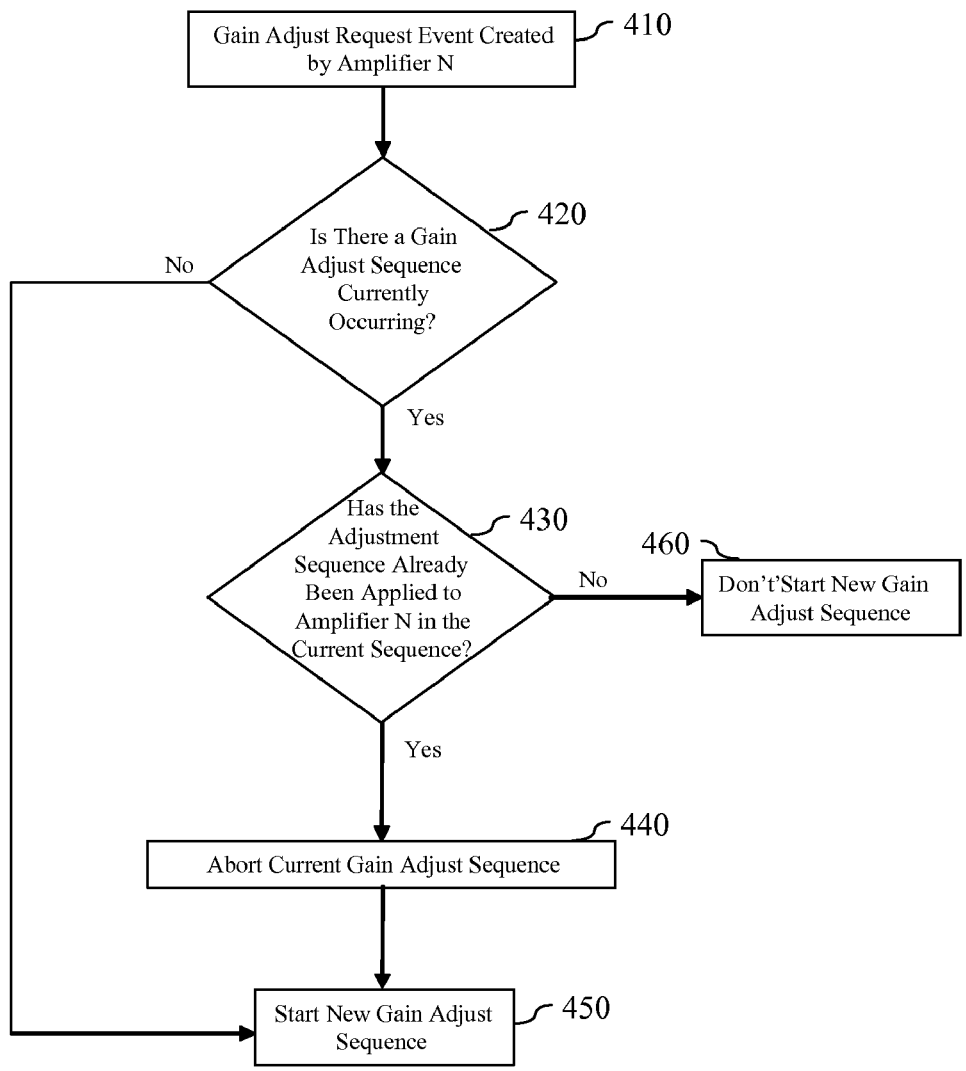
FIG. 4 is a flowchart describing a method for handling multiple simultaneous gain requests that are sent to a head end according to one embodiment.

There may be multiple gain requests in an optical link that are occurring quickly in time such that a previous gain adjust sequence has not completed. These gain requests may be given priorities relative to each other which control the resultant actions within the link. FIG. 4 illustrates an exemplary method for receiving and processing a new gain adjust request.

In one embodiment of the invention, a gain adjust request is created 410 locally at an optical amplifier. This gain adjust request may be initiated by various events such as a change in power at the amplifier input as previously described.

A check is performed 420 to determine whether a gain request sequence is currently occurring. If there is not a gain request sequence that is in the process of occurring, a new gain adjust request is generated to start a new gain adjust sequence 450. However, if a gain-adjust sequence is in process, then a check is performed 430 to determine whether the gain adjust sequence has already been applied to the amplifier.

If the gain adjustment sequence has been applied to the amplifier, then the current gain-adjust sequence is aborted 440. A new gain adjust request is generated and a new gain adjust sequence is generated 450. However, if the current gain adjust sequence has not been applied to the amplifier, then a new gain adjust sequence is not initiated 460 and the current gain adjust sequence is allowed to progress to the optical amplifier.

As previously explained, a fast constant gain mode is advantageous in a network that has sudden changes in the number of channel signals being transported over the optical link. In various other embodiments, fast local gain control loops result in fast correction for changes in the number of channels whereas corrections for a span loss is on the time scale of the slow control loop. If it is desired to prioritize the correction of span loss changes over channel numbers, then changes the local control loop could be run in constant output power mode (as opposed to const gain control) which would then give fast corrections for span loss changes and result in corrections for channel number changes would be on the time scale of the slow control loop.

While various embodiments of the present invention have been described above, it should be understood that they have been presented by way of examples, and not limitation. It will be apparent to persons skilled in the relevant art that various changes in form and detail may be made therein without departing from the spirit and the scope of the invention.

We claim:

1. A system for controlling optical link power, the system comprising:

a head node that transmits an optical signal, having a plurality of optical channels, on an optical link;

a plurality of amplifier nodes, serially coupled to the head node;

an end node, coupled to the plurality of amplifier nodes, that receives the optical signal from the optical link;

an amplifier gain control loop, coupled across one of the plurality of amplifier nodes, the amplifier gain control loop controlling said one of the plurality of amplifier nodes such that said one of the plurality of amplifier nodes applies a constant gain to each of the plurality of optical channels; and a link gain setting control loop coupled between the head end node and said one of the plurality of amplifier nodes, the link gain setting control loop adjusting a target gain value for said one of the plurality of amplifier nodes.

2. The system of claim 1 wherein, the optical signal is a first optical signal, and information is communicated to the link gain setting control loop via a second optical signal propagating on the optical link.

3. The system of claim 1 wherein the adjustment to the target gain value is performed by the link gain setting control loop in response to a gain adjust request received by the head end node from the first one of the plurality of amplifier nodes.

4. The system of claim 1 wherein the link gain setting control loop adjusts the target gain value in response to a change in a number of the plurality of optical channels.

5. The system of claim 1, wherein the amplifier gain control loop is a first amplifier gain control loop, the link gain setting control loop is a first link gain setting control loop, the constant gain is a first constant gain, the target gain is a first target gain value, and said one of the plurality of amplifier nodes is a first one of the plurality of amplifier nodes, the system further comprising:

a second amplifier gain control loop coupled across a second one of the plurality of amplifier nodes, the second amplifier gain control loop controlling said second one of the plurality of amplifier nodes such that said second one of the plurality of amplifier nodes applies a second constant gain to each of the plurality of optical channels; and a second link gain setting control loop, coupled between the head end node and the second one of the plurality of amplifier nodes, that adjusts a second target gain value for the second one of the plurality of amplifier nodes.

6. The system of claim 5 wherein a second gain adjustment process on the second one of the plurality of amplifier nodes is only performed if a first gain adjustment process on the first one of the plurality of amplifier nodes was successfully completed.

7. The system of claim 1 wherein time of flight protection is provided to detect a parameter change at the head end node or the first one of the plurality of amplifier nodes.

8. A system comprising:

a head node that transmits an optical signal, having a plurality of optical channels, on an optical link;

a plurality of amplifier nodes, serially coupled to the head node, that operate in a constant power mode;

an end node, coupled to the plurality of amplifier nodes, that receives the optical signal from the optical link;

an amplifier gain control loop, coupled across an amplifier node within the plurality of amplifier nodes, that provides constant output power across each of the plurality of optical channels; and a link gain setting control loop, coupled between the head end node and the amplifier node, that adjusts a target gain value for the amplifier node.

9. The system of claim 8 wherein the link gain setting control loop adjusts the target gain value in response to a change in a number of the plurality of optical channels.

10. The system of claim 8, wherein the amplifier gain control loop is a first amplifier gain control loop, the link gain setting control loop is a first link gain setting control loop, the constant output power is a first constant output power, the target gain is a first target gain value, and the amplifier node is a first amplifier node, the system further comprising:

a second amplifier gain control loop, coupled across a second amplifier node within the plurality of amplifier nodes, that provides a second constant output power on the second amplifier node across each of the plurality of optical channels; and a second link gain setting control loop, coupled between the head end node and the second amplifier node, that adjusts a second target gain value for the second amplifier node.

11. The system of claim 8 wherein the adjustment to the target gain value is performed by the link gain setting control loop in response to a gain adjust request received by the head end node from the first amplifier node.

* * * * *